(12) United States Patent
Motarwar et al.

(10) Patent No.: US 9,643,090 B2
(45) Date of Patent: May 9, 2017

(54) SYSTEM AND METHOD FOR USER ACTIVITY AND PREFERENCE ANALYSIS IN A MULTI-USER, MULTI-INSTANCE ENVIRONMENT

(71) Applicant: PartyGaming IA Limited, Hamilton (BM)

(72) Inventors: Suyash Motarwar, Hyderabad (IN); Neil Hussey, Gibraltar (GI); Ross McQuater, Gibraltar (GI); Hymavathy Routhu, Hyderabad (IN); Gaurav Duggal, Hyderabad (IN); Deepesh Kumar Singh, Kanpur (IN)

(73) Assignee: PartyGaming IA Limited, Hamilton (BM)

( * ) Notice: Subject to any disclaimer, the term of this patent is extended or adjusted under 35 U.S.C. 154(b) by 454 days.

(21) Appl. No.: 14/265,357

(22) Filed: Apr. 29, 2014

(65) Prior Publication Data

US 2015/0306504 A1    Oct. 29, 2015

(51) Int. Cl.
  *A63F 13/795* (2014.01)
  *A63F 13/80* (2014.01)
  *G06F 17/30* (2006.01)

(52) U.S. Cl.
  CPC .................. *A63F 13/795* (2014.09)

(58) Field of Classification Search
  CPC ........ A63F 13/795; A63F 13/80; A63F 13/00; A63F 13/005; A63F 13/10; A63F 13/12; A63F 13/216; A63F 13/25; A63F 13/30; A63F 13/335; G06F 17/30578; G06F 17/30339; A63B 71/06; A63B 2024/0071; A63B 2220/17; A63B 2220/44; A63B 24/0062; H04L 65/1036; H04L 65/104; H04L 65/1043; H04L 65/1096; H04L 65/4007; H04L 65/4038; H04L 65/80; H04L 67/306; H04L 67/38; H04L 69/16; A61B 2560/0209; A61B 2562/0219; A61B 5/1123
  See application file for complete search history.

(56) References Cited

U.S. PATENT DOCUMENTS

| | | | | |
|---|---|---|---|---|
| 7,739,210 B2 * | 6/2010 | Horvitz | ................ | G06Q 10/109 706/21 |
| 2006/0287101 A1 * | 12/2006 | Crawford, III | ..... | G07F 17/3293 463/42 |
| 2007/0049368 A1 * | 3/2007 | Kuhn | .................. | A63F 3/00157 463/12 |
| 2014/0024444 A1 * | 1/2014 | Lowell | ................ | G07F 17/3258 463/27 |
| 2014/0087815 A1 * | 3/2014 | Caputo | .................. | A63F 13/12 463/18 |

\* cited by examiner

*Primary Examiner* — Morshed Mehedi
*Assistant Examiner* — Shu Chun Gao
(74) *Attorney, Agent, or Firm* — Beem Patent Law Firm

(57) ABSTRACT

A system and method for user activity and preference analysis in a multi-user, multi-location digital environment that analyzes each user's state at each location where the user is present. If the user is present at multiple locations, the system and method also identify users that have mixed states, i.e., active at one or more locations and inactive at one or more second locations. If a user does not have a system-acceptable exception for its inactive state, the system and method may take action with respect to the user, which action may include warning the user or removing the user from the location.

7 Claims, 7 Drawing Sheets

SYSTEM AND METHOD FOR USER ACTIVITY AND PREFERENCE ANALYSIS IN A MULTI-USER, MULTI-INSTANCE ENVIRONMENT

BACKGROUND OF THE INVENTION

1. Field of the Invention

The present invention is directed to a computer-implemented system and method for user activity and user preference data analysis in a multi-user, multi-location environment.

2. Description of the Related Art

Certain digital environments may bring together multiple users of varying experience levels and skill. The users may congregate in multiple locations, with clusters of users at each location that are engaged with each other. The users often participate in a common activity, which might progress through one or more rounds. Although the activity is common to the users, each user may be self-interested and seeking to advance his or her position within the environment.

Within those environments, less experienced players may not be as well-versed in the intricacies of the environment and, as such, may be at a disadvantage as compared to when dealing with users of similar experience levels. For purposes of this application, less experienced players may be referred to as "novices," and more experienced players may be referred to as "experts," although it should be appreciated that the focus should be more on the experience disparity than on an actual experience level of the users.

Experts may increase their odds against novices if there are fewer other users at the location at the same time or if the expert does not have to engage with other users until a novice shows up. As such, an expert may reserve a position within a location with few or no other users and then become idle, waiting for the novices to show up.

Alternatively, an expert may passively monitor a location to determine the types of users that participate there. The expert then may target a location where one or more novices previously were and where he or she expects additional novices to join in the future. For example, novices may tend to be more risk averse and, therefore, may favor locations that are lower risk, lower reward, with the belief that they are joined by other novices. This assumption may be flawed, however, by the presence of experts, who may skew the experience level against the novices. Thus, a novice's small losses may add up over time to a substantial transfer to the experts.

Over time, these losses may tend to wear on the novices, diminishing their desire to return and thereby decreasing the overall population of users, diminishing an overall collection for the system.

At the same time, the system may host hundreds or thousands of users at hundreds or thousands of locations. In a computer-implemented environment, these locations may be hosted on multiple servers, which also may be located in different physical places. Each of these factors may contribute to making it impossible for an administrator to actively monitor all digital locations at all times.

What are needed are a system and method that seek to overcome one or more of the drawbacks described above.

BRIEF SUMMARY OF THE INVENTION

In one aspect, a method for user activity and preference analysis in a multi-user, multi-location digital environment may include the steps of: analyzing, for each user, a state at each location where the user is present; determining which users are present at multiple locations; identifying, for the multi-location users, mixed-state users that are active at a first location and inactive at a second location; determining if any of the mixed-stated users have a justification or exception for the inactive locations, and taking action with respect to the mixed-state users without any such justification.

The state in the analyzing step may be analyzed with regard to a user's indication of a future state preference for the location, and the identifying step may be performed with regard to a user's current state status for the separate location.

With respect to the step of determining whether any justifications or exceptions exist, action may be suspended for a mixed-state user at each location for which an exception exists. Multiple exceptions are possible. For example, an exception may include the user setting a future inactive state for each of the user's instances. Another exception may include the instance requiring the user to be inactive when the identifying step occurs. Still another exception may include the user temporarily being inactive due to insufficient resources. And a further exception may include all other users at a location also being inactive.

In another aspect, a method for user activity and preference analysis in a multi-user, multi-location digital environment may include the steps of: hosting a plurality of virtual gaming tables on a plurality of servers, determining, for each user, a state at each table where the user is seated, transmitting the user states to at least one of a plurality of global state managers hosted on at least one of the servers, compiling and analyzing, by the global state managers, the user states to determine which users are mixed-state users, wherein mixed-state users are active at at least a first table and inactive at at least a second table, delivering an identification of the mixed-state users and one or more of their inactive tables to the servers hosting those inactive tables; and taking action with respect to the mixed-state users at those inactive tables. In addition, the state in the analyzing step may be analyzed with regard to a user's indication of a future state preference for the table.

The method also may include comparing each user state in the determining step with a cached user state, where the transmitting step includes transmitting only those states that are different than the cached user states. The method further may include balancing analysis of the user states among the plurality of global state managers, which may include routing user states for a user to a server that is hosting at least one table where the user is seated.

In the method, the determining and compiling and analyzing steps may be implemented using threads in an asynchronous processing environment.

In either aspect, taking action may include transmitting a warning to a mixed-state user to remedy the mixed-state status. Additionally or alternatively, taking action may include removing a mixed-state user from the inactive at least a second location.

These and other features and advantages are evident from the following description of the present invention, with reference to the accompanying drawings.

DETAILED DESCRIPTION

A system and method for analyzing the activity state of a user in a multi-user environment and for taking action against a user that seeks to manufacture a competitive advantage over other users are described.

In one example, as described in greater detail below, the system and method may be particularly applicable to a digital gaming environment in which a user can be seated at more than one gaming table at a time.

The system may analyze the activity state of each user in real time in order to identify and take action against one or more users that attempt to manufacture a strategic advantage over other users.

In one aspect, the system may employ an identification filter, whereby each user that is active at one or more locations and, at the same time, is present but inactive at one or more second locations is identified as a suspect user.

The system and method, however, also may recognize that there are permissible justifications for some user inactivity and, therefore, should be able to identify and suspend action against those users. Thus, the system may be configured to segregate the actual, suspect users from genuine, non-problematic users.

In addition, technical challenges are magnified more than proportionally when the system is scaled. Yet as described herein, the system maintains real time analysis despite the presence of large numbers of concurrent users. For example, in the virtual gaming case described below, the system may be configured to operate with at capacity of least 100 concurrent users, preferably with a capacity of at least 1,000 concurrent users, and in one embodiment, a capacity of at least about 4,000 concurrent users. In the latter case, if each user plays, on average, at 10 different tables, that translates into 40,000 concurrent events to analyze and process. Even if sampling occurs only once a minute, that means that the system must be configured to process almost 2.5 million data points an hour. Moreover, data sampling may occur whenever changes in user activity state occur, i.e., they may be pushed toward the analytical tool rather than pulled by it at predetermined intervals, which means that sampling may occur significantly more frequently than once a minute, increasing the number of data points to be analyzed accordingly.

Identification Filter/Classification Process

Figure 1:
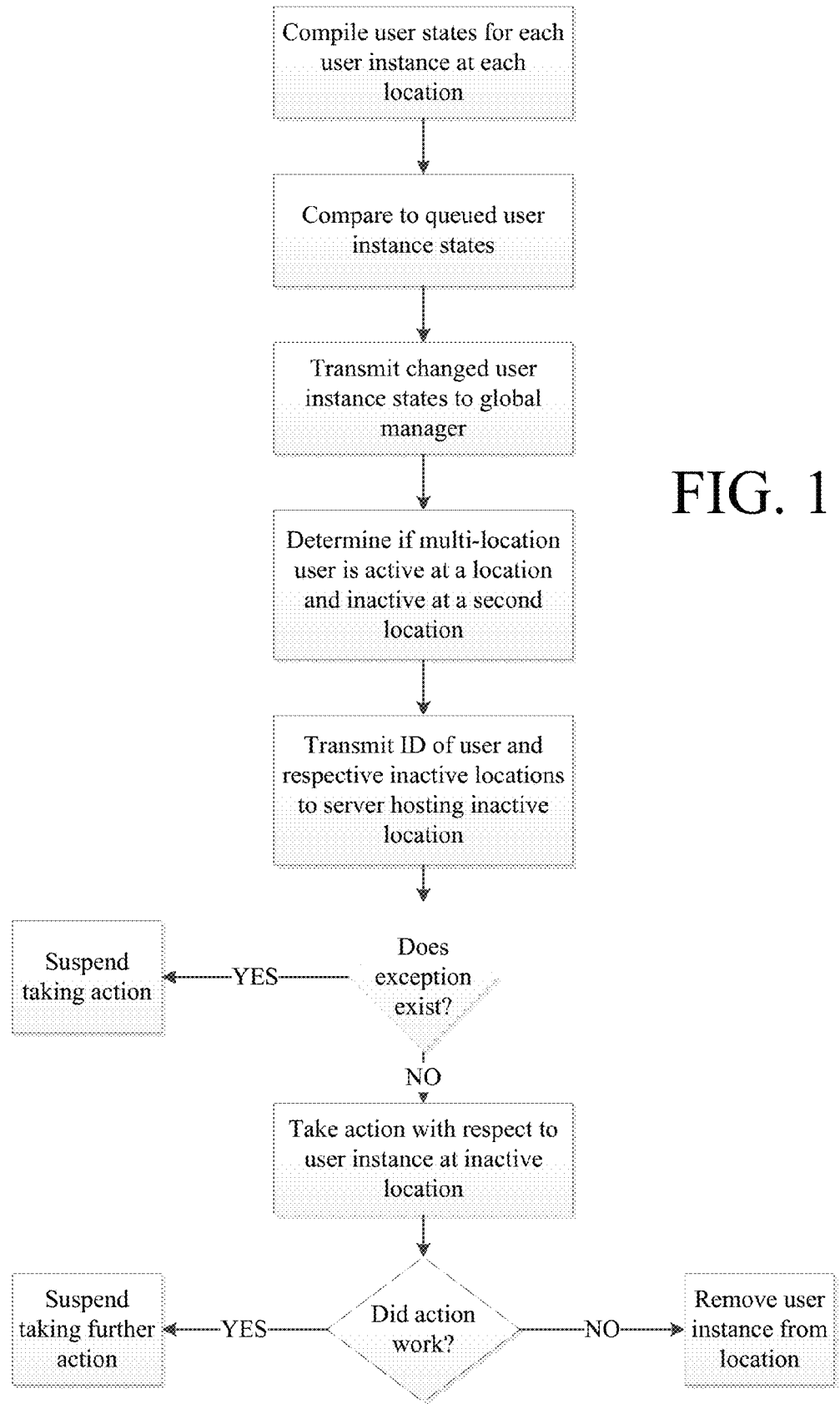
FIG. 1 is a process flow chart illustrating the data analysis method.

There are two parts to the solution of the general problem: (1) identify suspect users and (2) take action on them, which may a warning and/or some corrective action to deter future suspect behavior. One example of this process is illustrated in FIG. 1.

Identifying Suspect Users

At a high level, the first step in this process is analyzing each user's current activity to determine whether each user is present at a single location or multiple locations. The system and method are concerned primarily with suspicious behavior from multi-location users; thus only users currently present at more than one location may be pooled for further analysis.

The system then may classify each multi-location player into one of a plurality of subsets based on an aggregation of user state for all of the user's locations. Classification may occur on the basis of the user's current state at each table. Preferably, however, the system may classify each user based on the user's preferences, which may indicate a future activity state.

In one example, the system may include three subsets or modes, i.e.:

(1) universal inactive mode—In this mode, the user is inactive or has indicated that he will be inactive at each and every location at which he is present;

(2) all active mode—In this mode, no inactive option is selected, or the user has indicated that he or she intends to be active at each location; or (3) mixed-state mode—In this mode, the user has selected an inactive option, e.g., for some, but not all, locations joined by the user.

In one embodiment, this categorization may classify each user in Mixed-State Mode as a "suspect" or "suspicious" user. This may be considered the "default assumption."

The system and method also may recognize one or more exceptions to the default assumption. For example, even though the user may be inactive at a certain location, there may be other system restraints outside of the user's control that are preventing the user from having an active state. Each of these exceptions may place the user in a "watch state," pending resolution of the system restraint.

As long as any of these watch state exceptions continues to exist, the system may recognize the user's wild card state and not penalize the user for otherwise being in Mixed-State Mode with respect to the relevant location(s). The system, however, may continue to penalize the user if he or she is in Mixed-State Mode with respect to other locations to which no watch state exceptions apply. For example, a user may be present at four locations, including being active at two and inactive at two. Of the inactive locations, the user may be the only entity present at one location and no watch state exceptions may apply to the other location. In this situation, the system may recognize the exception to the first inactive location and take no action but may determine that the user is in Mixed-State Mode with respect to the second location, triggering the system's remedial actions with respect to that location.

The mode categorization assigned to each user is a dynamic characteristic, such that it keeps changing as the user's activity states change.

Taking Action

"Action" (which may be corrective or remedial) may vary from implementation to implementation, but in one example, it may comprise warning the user and then, if the user does not take remedial action, e.g., rejoining active state at the location or leaving the location, within a predetermined amount of time, removing the user from the location(s) at which the user is inactive.

Whereas user mode identification preferably may be determined on the basis of the user's indication of future preferences, action may occur based on the user's current, actual state at each location. This implementation means that certain users identified as being in Mixed-State Mode may not face corrective action for locations at which they are scheduled to be inactive but at which they currently are active.

Technical Implementation

The system can be implemented on a single server that is responsible both for implementation of the underlying activity, e.g., game implementation, and for these analytics. Preferably, however, is that the system will use multiple servers to host the activities. In this case, the user may be involved in locations hosted on different servers, and the system must be able to analyze user activity across all servers in order to analyze user activity accurately.

Each server may include multiple similar components as the other servers, as discussed in greater detail below. Data preferably is pushed from one component to the next, rather than waiting for a destination component to send a request to pull the data, although data transmission requests in that direction also are permissible.

Multiple Servers

Figure 2A:
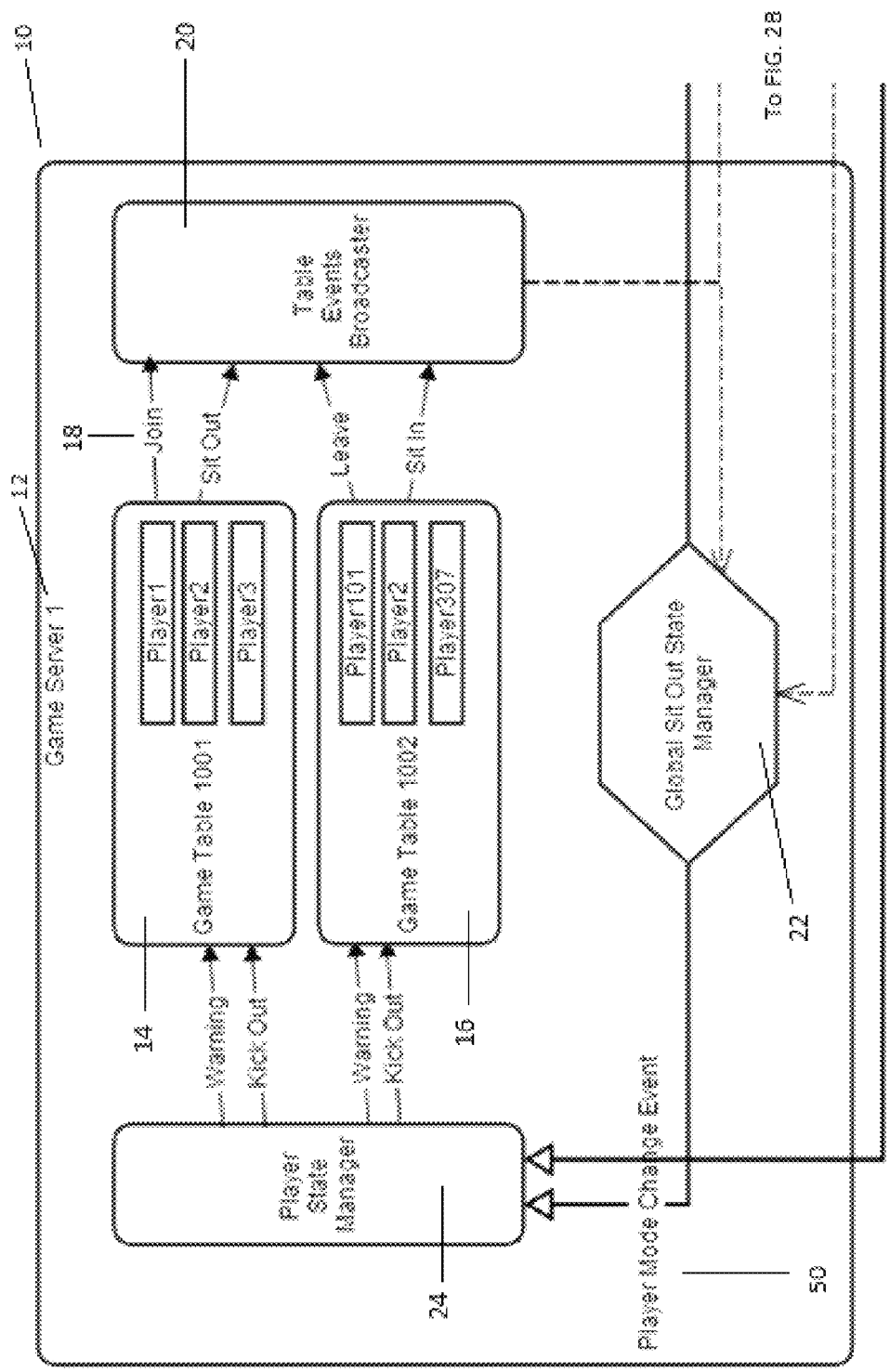
FIG. 2 is a high level system diagram of the components used to execute the method.
Figure 2B:
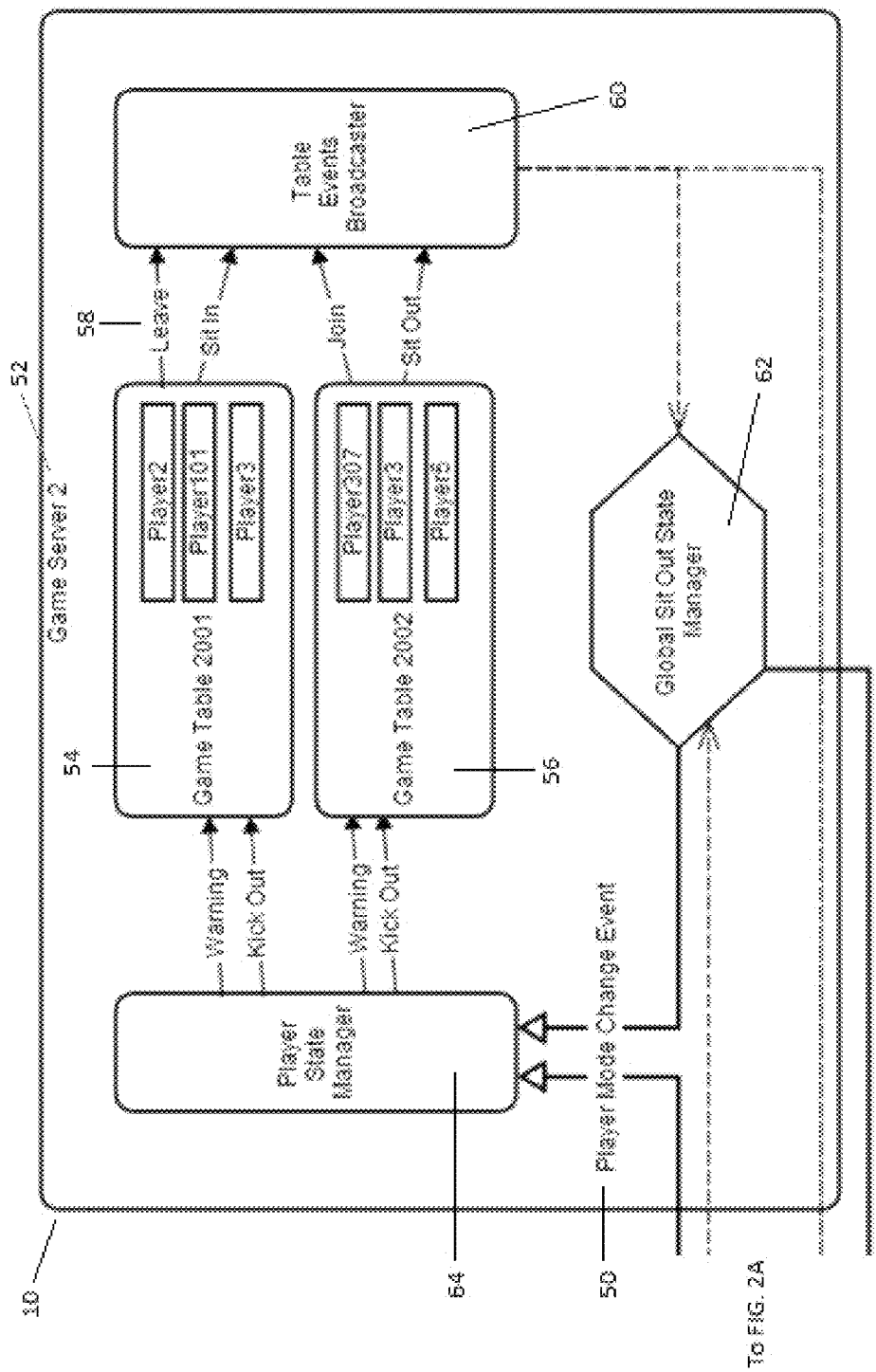
Figure 3A:
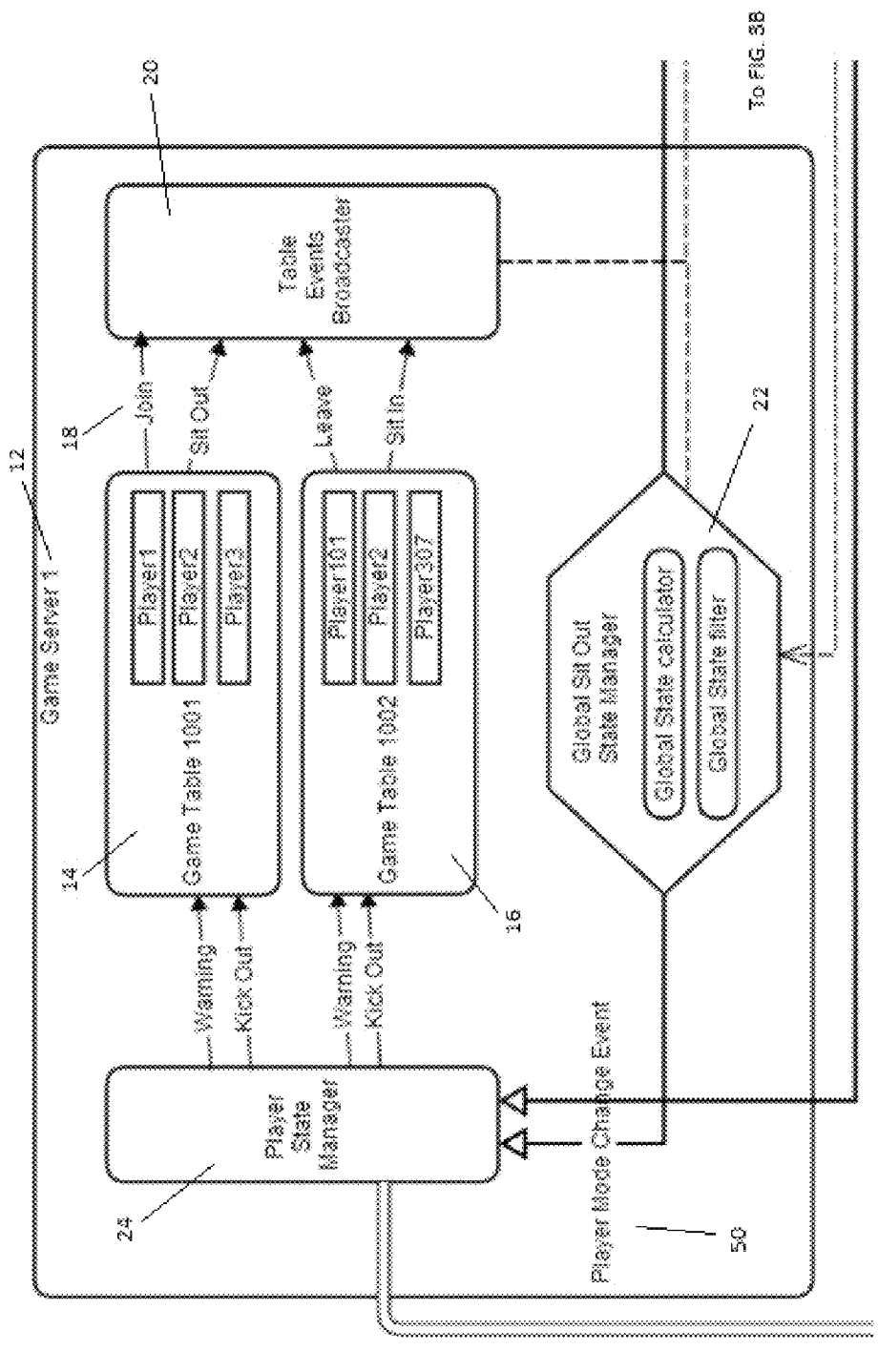
FIG. 3 is a more detailed system diagram of the components used to execute the method.
Figure 3B:
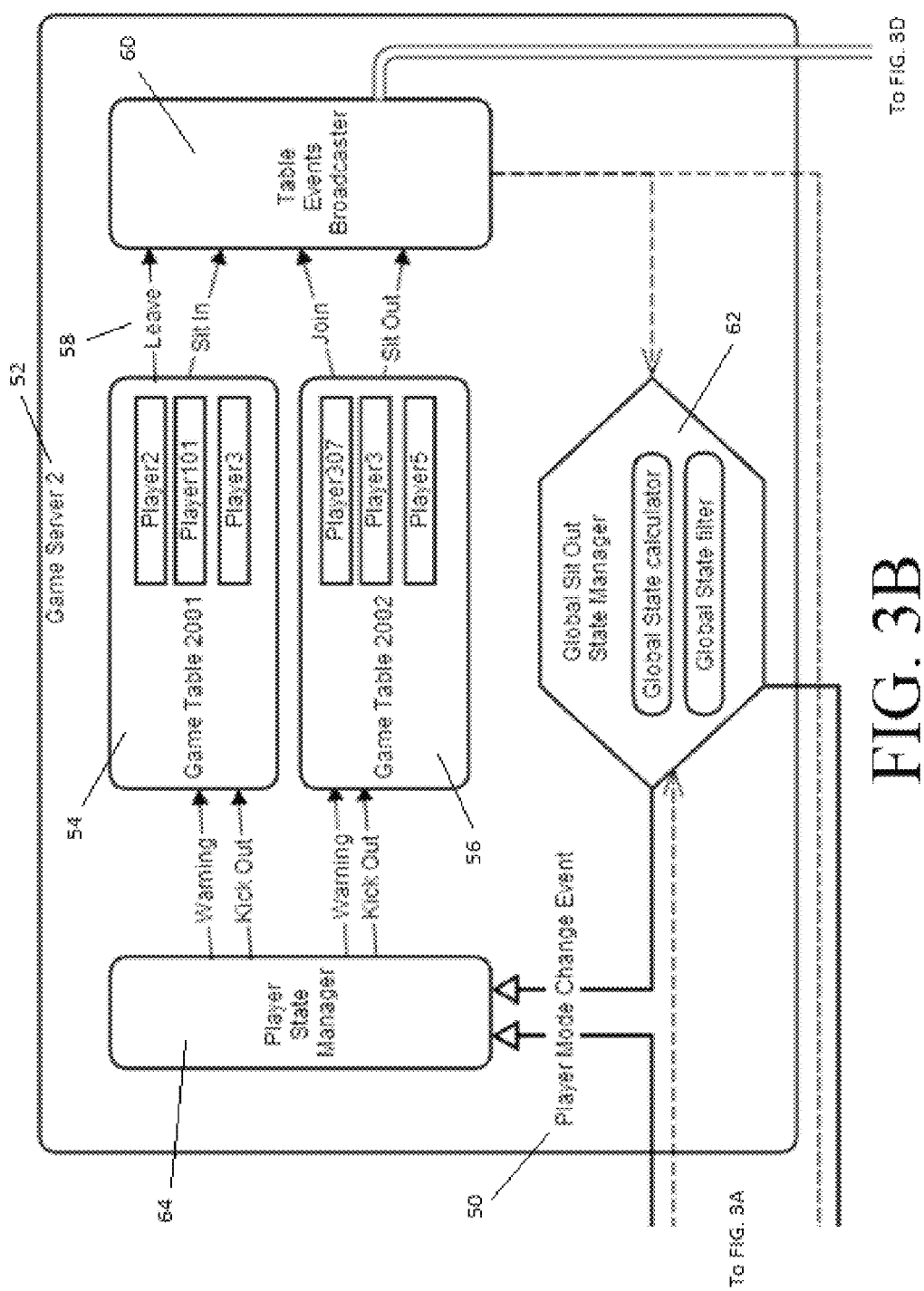
Figure 3C:
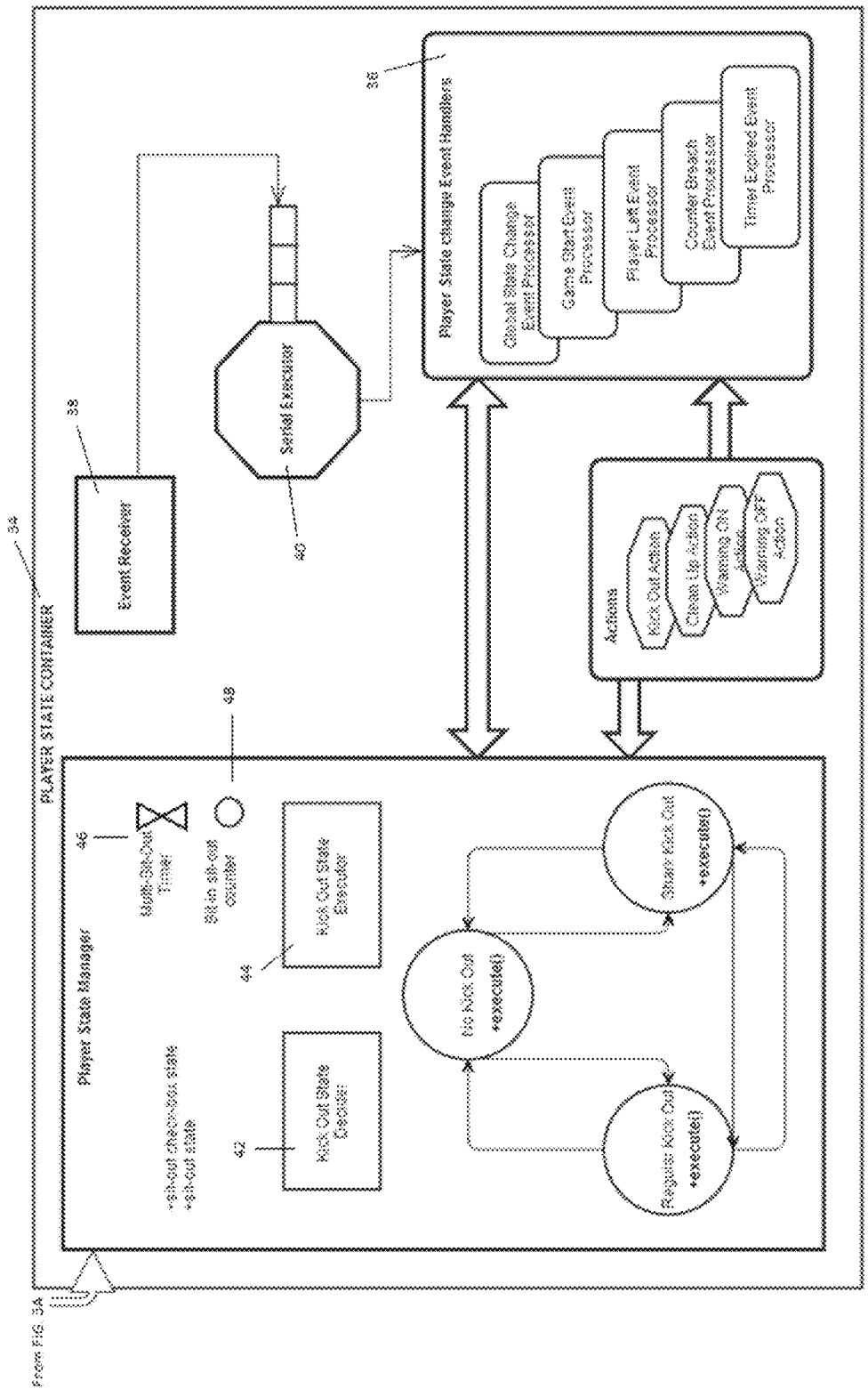
Figure 3D:
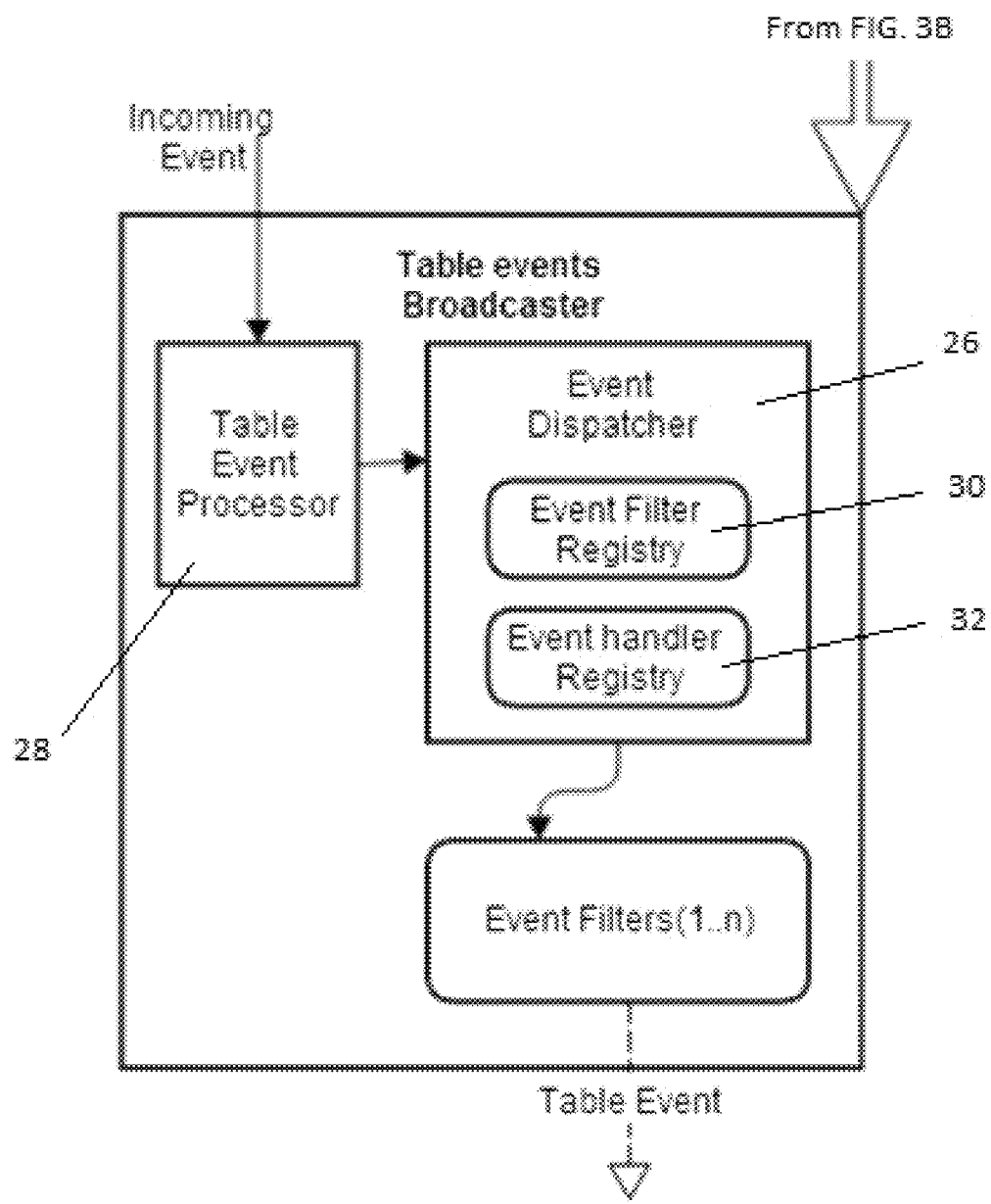

Turning now to FIGS. 2A and 2B, one example of a system diagram is shown, with the system specifically being configured to implement a multi-server, distributed gaming environment. System 10 may include a plurality of servers, including first server 12 and second server 52.

One example of a server usable as a component to system 10 and to execute the process may be a VM server made by VMware with a 3.07 GHz dual core XEON X5675 processor, the server also having 5,835 MB of memory. It will be appreciated that other server configurations also may be used, and that not all servers necessarily must have the same configuration.

First server 12 may host a plurality of locations 14, 16, and second server 52 may host a separate plurality of locations 54, 56. Each location on each server may be given its own, unique ID, and each user also may have a unique ID, although the same user ID may be used to signify the user's presence at different tables.

Whenever a user logs on to the system, the system may generate a unique hash key in order to trace and keep track of the user's activity throughout the system. In one aspect, the hash key may correspond to the user's ID, since each user ID also is unique, although the hash key may be a separate value entirely. Each hash key may be stored in a list that may be accessible by each of the system components in order to trace, analyze, and organize user activity data.

Locations

In addition to facilitating user activity, each location may maintain each present user's current state with respect to the current activity.

Each table also may maintain each present user's preferences with respect to future actions. The system may apply a default event state to each user, e.g., "active" if no other event state is selected.

At any given time, each user at each location may be assigned one of a plurality of event descriptors 18, 58. Exemplary event descriptors may include "join," "leave," "active," and "inactive," although other descriptors or combinations of descriptors may be possible.

Location data may be stored in a database either integrated into or in communication with a respective server or a plurality of servers in the latter case. While location data may be stored in a database, particularly as some of this data may need to be kept for auditing or recordkeeping purposes, data analysis as described below preferably occurs in memory.

Location (Table) Events Broadcasters

Event descriptors may be transmitted continuously and in real time to a location events broadcaster 20, 60 on each server, which is responsible for aggregating events for transmission to other system components, namely to a global sit out state manager 22, 62.

Each events broadcaster may maintain a local cache of user states for each user present at a location resident on its server. In order to contribute to system optimization and reduce the burden on system resources, the event broadcaster may compare each user state with its cached states to determine whether there has been any change in user states. The events broadcaster then may be configured to transmit only those instances of user events that have changed since the last transmission to the global sit out state managers ("global state manager"). As such, redundant or duplicate events are not published, consuming fewer system resources.

Global State Managers

System 10 may include a global state manager on one or more of its servers 12, 52 that is responsible for consolidating a state of the user across all locations, for analyzing those states by using a global state calculator to determine the user mode, and for implementing an identification filter in order minimize or eliminate a need for redundant, duplicative, unchanged, or otherwise unnecessary transmissions, as discussed above.

Global state managers 22, 62 may be hosted across all servers 12, 52, which may provide one or more advantages to the system. First, a distributed series of global state managers may insulate the system from a total failure in the event that one or more global state managers fail, i.e., there may be no single point of failure. In this case, the system may reset one or more of the state managers without interrupting location activity being hosted on the rest of each server. Considering that a reset may take a few minutes, e.g., about five minutes, the advantage of this separate configuration becomes apparent. In addition, the system may provide a deterrent effect to users from engaging in mixed-state mode, and if users are not aware that this aspect of the system is offline because it runs in a back-end environment, the overall impact on the system may be minimized.

Second, by distributing the global state manager across multiple servers, the system may take advantage of the parallel processing made possible by having multiple CPUs do the analysis and identification.

In one embodiment, location events broadcasters 20, 60 may transmit events to each server's global state manager. Each global state manager then may cross-reference the events with a list of users (e.g., via hash keys) assigned to that global state manager to determine if it is to analyze that user's actions. Preferably, however, the system may distribute user activity according to the server responsible for its analysis prior to transmitting that data.

The system may include load balancing or load optimization to distribute analysis among the multiple global state managers and to prevent any one global state manager from shouldering too large a computational load. In one aspect, optimization may include routing events for a user to a server on which the user is present at at least one hosted location, because that would be at least one less event to be transmitted outside the server from the respective events broadcaster. Similarly, if the user is present at multiple locations that reside on a single server, that server should be weighted even more heavily to receive the user's other events.

Additionally or alternatively, optimization may include a counter or other way to determine the number of users being analyzed by each global state manager and may route analysis of the next new user to the global state manager with the lowest load. Other load balancing or optimization techniques also may be employed.

Much like the filtering/load reduction techniques discussed above regarding the events broadcasters, the global state managers may implement local filtering at a global state filter to reduce the amount of data to be transmitted from a global state manager to other system components. For example, each global state manager may maintain a local cache or queue of the modes of its analyzed users. Once the system determines a user mode, the global state manager may compare that mode with the cached copy it maintains for the user.

The system then may transmit only those user mode changes in the case that there is a change in mode for a user, thereby minimizing the number of mode events generated and processed. Between this filtering and that done with respect to the events broadcasters, system 10 may reduce a number of events requiring further analysis by significant amount. For example, these filters may be responsible for reducing the number of events to be processed by between about 50% and about 70%. By implementing one or more of these filters in a distributed network environment, latency may be reduced significantly, such that the process make take less than about five seconds, preferably less than about three seconds, and still more preferably less than about one second, even when the volume of tables and users measures in the thousands or ten of thousands.

The global state manager also may be configured to consume events in a concurrent environment, whereby user-specific and table-specific events preferably are processed sequentially. In other words, the system is configured to determine when user event states change for each of the user's table instances. This ability may be significant, because a change in event state on one table may move the user from an acceptable to an unacceptable mode, or vice-versa.

In order to ensure sequential handling of the events, system 10 may maintain as many virtual queues as there are users seated on the tables across the servers.

User/Player State Manager

Once system 10 determines the mode for each user, it can determine whether action is necessary with respect to any of the users and, if so, take such action. Responsibility for taking action against a user may lie with a user state manager 24, 64 on each server. User state manager may include one instance per user per location, since corrective action may be taken with respect to individual locations, even if the user is seated at multiple locations requiring action.

As stated above, global state managers may determine that action is necessary with respect to one or more locations for one or more users, depending upon the user modes determined by the global state managers. Global state managers may transmit updated user modes to at least the respective user state managers 24, 64 on servers hosting those locations.

User state manager 24, 64 then may compare the user's actual status with the user's preference on the location for which action is indicated, i.e., a location for which the user preference is to be inactive while the user has a preference to be active at one or more other locations. If the user's current status is to be inactive at one location—and not at all locations—user state manager 24, 64 may transmit an initial warning to the user for a certain period of time. In one embodiment, the period of time may be 15 seconds, although the time period also may be configurable. If the user does not change modes within the allotted time, either to active mode or a universal inactive mode, user state manager then may remove the user from the impacted location.

In another aspect, global state manager may transmit all user modes to the user state managers and not just those corresponding to players in the Mixed-State Mode. User state manager then may analyze each user mode but take no action if the user mode is determined to be either active mode or a universal inactive mode. In the event that the system issued a warning to a user, who subsequently implemented a universal inactive mode, the user state manager then may terminate this warning and not remove the user from the table in question.

In either aspect, user state manager 24, 64 also may analyze recent user activity to ensure that a user is not attempting to bypass the rules, e.g., by switching to an active mode after receiving a warning but then going inactive again without engaging in any activity. System may permit the user to do this a predetermined number of times, e.g., three times, after which user state manager may remove the user automatically from the table.

Although system 10 may process user activity substantially in real time, the system also may include a built in delay in order to permit the user to resolve an inadvertent Mixed-State Mode designation. For example, in one embodiment, the system may build in a 3 second delay between user mode determination and delivery of a warning. This time delay may be configurable to either lengthen or shorten the delay.

Turning now to FIGS. 3A, 3B, 3C, and 3D, a more detailed system architecture diagram is shown. Like the system diagram of FIGS. 2A and 2B, the system diagram includes a plurality of servers 12, 62, each server hosting multiple locations, a location events broadcaster, a global state manager, and a user state manager.

The diagram of FIGS. 3A, 3B, 3C, and 3D further illustrates that each table events broadcaster 20, 60 may include or be in communication with an event dispatcher 26. For each type of event, a different dispatcher 26 may be implemented to optimize the processing or filtering actions associated with the specific event. For example, duplicate events may not affect a global state of a user. Thus, upon receiving an incoming event from a location via a table event processor 28, the event dispatcher may identify and filter out those events or other similar events that do not affect the global state of a user.

This pattern implementation also may build extensibility into system 10 so that the addition of a new event type may be handled by creating a new dispatcher, e.g., by adding a new entry to an event filter registry 30 and/or a desired course of action to an event handler registry 32. By building the logic into the event dispatcher, the system may adapt flexibly to the new type without affecting other existing components.

The appropriate target global state manager for each event may be on a local server 12 or a remote server. As such, as the events pass the above filters, event dispatcher 26 then may identify which global state manager 22, 62 is the correct target to receive the user's event and then may transmit the event to that manager for further processing.

Returning to FIG. 3C, it can be seen that a user state manager 24 may reside within a user state container 34 that also may include a plurality of user state change event handlers 36 in communication with an event receiver 38 and a serial executor 40.

State change event handlers 36 may encapsulate the event specific handling for the events submitted to user state manager 24. In addition to the standard in-game processing events that may be received from a global state change event processor, event handlers 36 also may handle less frequent event occurrences, such as game starts and players leaving tables.

Each player state manager 24 may include an action state decider 42 for determining what actions to take with respect to a user, given the mode determined by global state manager 22, and an mixed-state executor 44 for implementing the action determined by state decider 42.

As discussed above, the system may be configured to apply certain corrective actions to a user at one or more locations depending on the user's mode as determined by the global state manager and depending on the user's specific, current status at those locations.

In addition, state decider 42 should be configured with a rule set instructing state executor 44 to remove a user from a location due to an extended period of inactivity. This is implemented to ensure that a user does not occupy a location position for a long duration without any apparent intention to be active.

Inactivity counter 48 additionally or alternatively may be configured to record a number of times the user executes an active/inactive sequence, which the user may do in an attempt to bypass the system warnings. In this configuration, if inactivity counter 48 records a predetermined or configurable number of consecutive active/inactive transactions without the user taking any substantive action, e.g., three transactions, the system may be configured to remove the user from the location.

Thread Implementation

The system as shown in the drawings comprising FIGS. 2 and 3 may use threads extensively in one or more system components. Threads may permit asynchronous processing of both local and remote events, which may safeguard core activity by segregating it from user analysis activity. Thread implementation also may permit parallel processing by the multiple system servers, yielding higher throughput and faster turnaround time.

Thread implementation may proceed in the following fashion, which may be illustrated best as it relates to the digital gaming example presented below:

A game-play thread may deposit location events in a queue, e.g., TableEventsQueue, and then proceed with its tasks without waiting for further implications of this event.

ThreadPoolExecutor implemented in Table Events Broadcaster 20 may obtain table events from this queue and proceed further. The system may implement a synchronization requirement for these threads at an individual table-user level, i.e., ThreadPoolExecutor should execute only one table-event per user per table at a time. Multiple events from the same user but on different tables, however, may be processed simultaneously.

The events may be filtered, e.g., to remove duplicate events or events that haven't changed from the last iteration and, after local processing by table events broadcaster 20 may be dispatched to the correct Global Sitout State Manager 22, which may be selected based on the application of load balancing, as discussed above. These player events then may be submitted to another queue, e.g., GlobalEventsQueue.

Global Sit Out Manager 22 may implement a Thread Pool Executor and may retrieve user events from GlobalEventsQueue for further processing and filtering. Because Global Sit Out Manager 22 is tasked with determining a user mode based on the totality of the user's activity, a synchronization requirement for these threads may be at individual user level, requiring that only one event per user across all tables should be executed at a time.

After this processing is completed, thread PlayerModeChangeEvent 50 that is seen in the drawings comprising FIGS. 2-3 may be generated and sent to the user state modules. These PlayerModeChangeEvents then may be submitted to another queue, e.g., playerStateEventQueue.

A ThreadPoolexecutor implemented in Player State Container 34 may obtain PlayerModeChangeEvents from this queue, i.e., playerStateEventQueue, and may execute further. At this stage, the system may require synchronization for these threads at an individual table-user level, i.e., for each user-occupied table, only one user state event should be executed at a time. As with ThreadPoolExecutor, multiple events from the same user but on different tables can be processed simultaneously.

Example 1: Computer-Implemented Gaming Environment

In this example, locations may comprise virtual, digital gaming tables, and a strategic advantage may comprise a more experienced user sitting out at one or more tables while waiting for a less experienced user to appear, at which point the more experienced user may return to the table in an attempt to win funds from the less experienced user.

This example presents one manner in which the process flow may occur. Technical implementation may be supported by the detailed description presented above.

Sitting out from a game at one or more tables may be a normal, regular event not deserving of remedial action, however. For example, a user may need to take a break from a session and may wish to continue after some time. In this case, the user can choose to sit out from all tables immediately after completion of a current game or of all current games at which the user is seated (e.g., if the user is seated at four tables, two of which are active, the user may sit-out at one of the active tables when the current hand at that table finishes, continue playing at the other active table, and then sit out at that table—and therefore at all tables—when that second hand finishes). This wait may take a few seconds or a few minutes, depending on the level of activity of the active tables, and the system may recognize that the user should not be penalized during this time span.

Alternatively, a user may be seated at one or more tables where blinds, e.g. a small blind and a big blind, are contributed by a subset of the users at the table at each hand, i.e., each round. If the user seeking to sit out is not one of the users required to contribute a blind, the user can play pocket cards without a change in the amount of his or her funds if they initially appear worthwhile and then can sit out when it is the user's turn to contribute the big blind. As with the previous sit-out option, this feature can take effect once a big blind has been reached on any table or, preferably, it may take effect sequentially, such that the user is seated out at each respective table when the blind position is reached at that table.

Both of the above requirements give rise to a scenario where a genuine user would be playing on some tables and sitting-out on others, causing the system to potentially perceive the user as a suspect user. The system and method, however, should be able to identify and not attempt remedial action against those users. Thus, the system may be configured to segregate the actual, bad users from genuine, non-problematic users.

Regarding analyzing the user's current activity state, the system may include the option to "sit-out next hand" or "sit-out next big blind," which each reflect a future preference to sit out at that table. If the user has either of these options selected, the system may classify that user as being in the "universal inactive mode."

Conversely, not selecting either of these options (or any other kind of sit out option) may correlate to a future preference to sit in, i.e., to play actively at that table and may correspond to the user being classified in the "all active mode."

In addition, "mixed-state mode" may correspond to the user indicating a preference to sit out at one or more tables while remaining active at one or more other tables.

In a digital gaming environment, multiple exceptions may exist that may trigger placing the user into a "watch" state. A non-exhaustive list of these exceptions may include one or more of:

(1) The user being the only entity seated at a table;
(2) The user having joined a table with a game already in progress, where the system requires the user to sit out and wait until a permitted entry point (e.g., the start of a new hand);
(3) The user having insufficient funds to continue playing. In this example, the system may leave the user at the table in a sitting-out state in order to permit the user to refill his or her account; and
(4) All other users on the table sitting out, such that the user could not play even if he or she wanted to.

As stated above regarding the system and method generally, determining whether to take action with respect to user activity may occur based on the user's current, actual state at each location. This implementation means that certain users identified as being in Mixed-State Mode may not face corrective action for tables at which they are scheduled to sit out but at which they currently are active. For example, a user that is playing at a first table and that has selected the "sit-out next hand" option at a second table but that is still part of the current game at that second table may not receive a warning or be removed from the table, even if the selected sit-out preference would mean that the user initially is identified as being in Mixed-State Mode Regarding system structure, in addition to facilitating user game play, each table may maintain each seated user's current state with respect to the hand currently being played, e.g., "sit-in," i.e., part of the current hand, or "sit-out," i.e., not part of the current hand.

Note that users may be considered to be "sitting-in" if they have seen their cards at any point during the hand; thus, users that have folded and are not currently active in the hand still are considered to be "sitting in."

State decider 42 may apply the following logic in determining what action, if any, to take against a user:

If the Player Mode as determined by global state manager 22 is Mixed-State Mode and current status of the player on this table is Sit-Out, issue an initial warning for a predetermined or configurable amount of time, e.g., about 15 seconds, which may be tracked using timer 46. If, within that time, player status on that table changes to Sit-In, cancel the warning. Alternatively, if the player does not change to a Sit-In mode within the time amount, kick-out the player from the table and change the player's state to "Mixed-State Kick-Out" (MSKO state).

If the Player Mode is Play Mode, do not kick-out the player and, if necessary, change the player's state to "No Kick-Out" (NKO state). In the event that the player was scheduled to be kicked out earlier, the state decider should cancel this kick-out action.

If the Player Mode is Universal Sit-Out Mode, do not kick-out the player at this point. In the event that the player was scheduled to be kicked out earlier, the state decide should cancel this kick-out action.

In this example, the inactivity counter may be a sit out counter that keeps track of the number of consecutive hands that the user sits out at a given table. The sit out (inactivity) counter 48 may be configured to increment with each consecutive hand that the user is inactive. Then, state executor 44 may be instructed to kick the player out if the does not return to the table within a configurable or predetermined number of hands. For example, sit out counter may be set to trigger state executor if the player sits out between about 3 and about 100 hands, preferably between about 10 and about 70 hands, still more preferably between about 15 hands and about 40 hands, and in one embodiment, about 25 hands. In the event this occurs, kick out state decider 42 may modify the player's state to "Regular Kick-out" (RKO).

Example 2: Computer-Implemented Trading Environment

This example presents a second manner in which the process flow may occur. Again, technical implementation may be supported by the detailed description presented above.

The current system and method also may be adapted to a digital trading environment in which multiple users can be present in multiple virtual locations, e.g., trading desks. In this example, system administrators may not want users to take seats at multiple desks—because seating may be at a premium or for any other reason—and not be active at all of those seats. The same methodology as described above may apply in this scenario, with the system transmitting a warning and, if no remedial action is taken within a predetermined time, removing the user from the inactive position(s).

While the foregoing written description of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiments and methods, but by all embodiments and methods within the scope and spirit of the invention as claimed.

What is claimed is:

1. A method for user activity and preference analysis in a multi-user, multi-location digital environment, comprising:
    hosting a plurality of virtual gaming tables on a plurality of servers;
    determining, for each user seated at two or more of the plurality of virtual gaming tables, a state of the user at each virtual gaming table where the user is seated;
    comparing each user state in the determining step with an associated cached user state;
    transmitting the user states to at least one of a plurality of global state managers hosted on at least one of the servers for those user states that are different than their associated cached user state;
    compiling and analyzing, by the global state managers, the user states to determine which users are mixed-state users, wherein mixed-state users are active and seated at a first virtual gaming table and inactive and seated at a second virtual gaming table;

delivering an identification of the mixed-state users and one or more of their inactive virtual gaming tables to the servers hosting those inactive virtual gaming tables; and taking action with respect to the mixed-state users at those inactive virtual gaming tables.

2. The method of claim 1, wherein the state in the analyzing step is analyzed with regard to a user's indication of a future state preference for the virtual gaming table.

3. The method of claim 1, further comprising balancing analysis of the user states among the plurality of global state managers.

4. The method of claim 3, wherein the balancing step comprises routing user states for a user to a server that is hosting at least one virtual gaming table where the user is seated.

5. The method of claim 1, wherein the determining and compiling and analyzing steps are implemented using threads in an asynchronous processing environment.

6. The method of claim 1, wherein action comprises transmitting a warning to a mixed-state user to remedy the mixed-state status.

7. The method of claim 1, wherein action comprises removing a mixed-state user from the second virtual gaming table.

\* \* \* \* \*